(12) United States Patent
Baudin et al.

(10) Patent No.: US 9,065,508 B2
(45) Date of Patent: Jun. 23, 2015

(54) TRANSMITTER HARMONIC CANCELLATION FOR CARRIER AGGREGATION/MULTIBAND OPERATION

(71) Applicant: Broadcom Corporation, Irvine, CA (US)

(72) Inventors: Pierre Baudin, Rennes (FR); Mikael Guenais, Rennes (FR)

(73) Assignee: BROADCOM CORPORATION, Irvine, CA (US)

(*) Notice: Subject to any disclaimer, the term of this patent is extended or adjusted under 35 U.S.C. 154(b) by 63 days.

(21) Appl. No.: 14/060,110

(22) Filed: Oct. 22, 2013

(65) Prior Publication Data

US 2015/0111510 A1    Apr. 23, 2015

(51) Int. Cl.
*H04B 1/10*    (2006.01)
*H04B 1/04*    (2006.01)

(52) U.S. Cl.
CPC ...... *H04B 1/0475* (2013.01); *H04B 2001/0408* (2013.01)

(58) Field of Classification Search
CPC ........ H04B 1/10; H04B 1/525; H04B 1/1027; H04B 1/0475
USPC .................. 455/501, 63.1, 67.11, 570, 114.2, 455/115.1, 296, 278.1; 375/346, 350
See application file for complete search history.

(56) References Cited

U.S. PATENT DOCUMENTS 5,574,978 A * 11/1996 Talwar et al. ................ 455/63.1
5,835,848 A * 11/1998 Bi et al. ......................... 455/24
8,792,598 B1 * 7/2014 Cendrillon et al. ........... 375/346

* cited by examiner

*Primary Examiner* — Tuan Pham
(74) *Attorney, Agent, or Firm* — Foley & Lardner LLP; Joseph N. Ziebert; Angela D. Murch

(57) ABSTRACT

A method and apparatus for cancelling, from signals received by a radio device in a first frequency band, interference generated by the radio device in the first frequency band when the radio device transmits simultaneously radio signals on at least a second frequency band.

15 Claims, 4 Drawing Sheets ns a metho
TRANSMITTER HARMONIC CANCELLATION FOR CARRIER AGGREGATION/MULTIBAND OPERATION

TECHNICAL FIELD

The present invention generally relates to a method and a device for cancelling interference from signals received by a radio device in a first frequency band, while interference is generated by the radio device when the radio device simultaneously transmits radio signals on at least a second frequency band.

BACKGROUND INFORMATION

In new wireless cellular telecommunication networks and in particular in the Third Generation Partnership Project (3GPP), Long Term Evolution advanced, new features are considered. One of the new features is Carrier Aggregation. Downlink Aggregation enables radio devices to transmit or receive simultaneously on two frequencies in two different frequency bands, thus doubling the theoretical throughput in Downlink.

The radio device may receive simultaneously signals in plural frequency bands which are different from the frequency bands the radio device uses for transmitting radio signals.

Depending on the allocated frequency bands for radio signals transmission and/or reception, harmonic frequencies of transmitted signals may fall into the frequency band used by the radio device for receiving radio signals.

An example of such situation is disclosed in reference to FIG. 1a.

FIG. 1a schematically presents an example of harmonic emissions a.k.a. harmonics generated on signals transmitted by a radio device in a first frequency band which fall into a frequency band used by the radio device for receiving signal.

In FIG. 1a, the horizontal axis shows a frequency span in which a first frequency band TX1 is used by the radio device for the transmission of uplink signals. A second frequency band Rx1 is used by the radio device for the reception of downlink signals. A third frequency band Rx2 is used for the reception, by the radio device, of downlink signals.

The frequency band TX1 includes and is between 704 MHz and 716 MHz. The frequency band Rx1 includes and is between 734 MHz and 746 MHz. The frequency band Rx2 includes and is between 2110 MHz and 2155 MHz.

For instance, when the radio device is transmitting on the frequency band TX1, there are unavoidable emissions around the third harmonic of the transmit signal carrier frequency due to the non-linearity of the signal processing elements, such as power amplifiers, filters and RF switches.

When these emissions around the $3^{rd}$ order harmonics of the TX carrier frequency overlap the received channel frequencies, the sensitivity in frequency band Rx2 can be significantly degraded, especially if the power level of these emissions is in the range or significantly higher than the power of the downlink received signal.

Such situation, as disclosed in the present example, may degrade the performance of the radio device.

In other wireless cellular telecommunication systems, the frequency band used for reception is close to the frequency band used for transmission. Despite some filtering performed on the transmit signals, there may be spectral regrowth of the transmitting signal due to the high power amplifier non-linearity. Adjacent Channel Leakage power Ratio spectral regrowth (ACLR) may occur on the reception frequency band, even with use of a transmit filter. An example is given in FIG. 1b.

FIG. 1b schematically presents an example of noise generated by signals transmitted by a radio device in a frequency band which falls into a frequency band used by the radio device for receiving signal.

In FIG. 1b, the horizontal axis shows a frequency band in which a first frequency band TX2 is used by the radio device for the transmission of uplink signals. A second frequency band Rx3 is used by the radio device for the reception of downlink signals.

In this non-limiting example, the frequency band TX2 includes and is between 777 MHz and 787 MHz. The frequency band Rx3 is included between 746 MHz and 756 MHz.

The curve noted Stx represents the power of signals transmitted by the radio device on the air interface. As it can be seen in FIG. 1b, as the signal transmitted in TX2 frequency band experiences some non-linearity, it generates a non-negligible out of band noise, a fraction of which lies within the frequency band Rx3. Moreover, the curve noted Resp represents the frequency response of the filter which attenuates signals transmitted by the radio device in the frequency band Rx3. But the filter attenuation is limited, and therefore it does not completely eliminate the unwanted emissions, thus the radio device sensitivity in the frequency band Rx3 is decreased.

The present invention aims at providing a method and a device for reducing interference generated by signals transmitted by a radio device on a least one frequency band used for receiving radio signals by the radio device.

SUMMARY

The present invention concerns a method for cancelling, from signals received by a radio device in a first frequency band, interference generated by the radio device in the first frequency band when the radio device simultaneously transmits radio signals on at least a second frequency band, different from the first frequency band, the method causing the device to perform:
  converting digital signal to be transmitted to analog signals to be transmitted in the second frequency band,
  executing a first processing on the analog signals to be transmitted in the second frequency band, the first processing generating interference signals in the first frequency band due to non-linearity of the first processing,
  executing a second processing at least on the interference signals generated in the first frequency band,
  sensing, the interference signals in the first frequency band and converting the sensed interference in the first frequency band into digital samples of the interference,
  applying to the digital signal to be transmitted a mathematical model that mimics the non-linearity of the first processing,
  performing an adaptive filtering in order to provide digital samples for correction, wherein the adaptive filtering mimics the second processing and uses the digital samples of the interference and the digital samples on which the mathematical model is applied,
  converting received analog signals in the first frequency band into digital received signals,
  cancelling from the digital received signals the interference using the digital samples for correction.

The present invention also concerns a radio receiving device for cancelling, from signals received by a radio device in a first frequency band, interference generated by the radio device in the first frequency band when the radio device transmits simultaneously radio signals on at least a second frequency band, different from the first frequency band, the device including circuitry causing the device to implement:

means for converting digital signal to be transmitted to analog signals to be transmitted in the second frequency band, means for executing a first processing on the analog signals to be transmitted in the second frequency band, the first processing generating interference signals in the first frequency band due to non-linearity of the first processing, means for executing a second processing at least on the interference signals generated in the first frequency band, means for sensing, the interference signals in the first frequency band and converting the sensed interference in the first frequency band into digital samples of the interference, means for applying to the digital signal to be transmitted a mathematical model that mimics the non-linearity of the first processing, means for performing an adaptive filtering in order to provide digital samples for correction, wherein the adaptive filtering mimics the second processing and uses the digital samples of the interference and the digital samples on which the mathematical model is applied, means for converting received analog signals in the first frequency band into digital received signals, and means for cancelling from the digital received signals the interference using the digital samples for correction.

The present invention also concerns a radio receiving device for cancelling, from signals received by a radio device in a first frequency band, interference generated by the radio device in the first frequency band when the radio device transmits simultaneously radio signals on at least a second frequency band, different from the first frequency band, the device including circuitry causing the device to implement:

converting digital signal to be transmitted to analog signals to be transmitted in the second frequency band, executing a first processing on the analog signals to be transmitted in the second frequency band, the first processing generating interference signals in the first frequency band due to non-linearity of the first processing, executing a second processing at least on the interference signals generated in the first frequency band, sensing, the interference signals in the first frequency band and converting the sensed interference in the first frequency band into digital samples of the interference, applying to the digital signal to be transmitted a mathematical model that mimics the non-linearity of the first processing, performing an adaptive filtering in order to provide digital samples for correction, wherein the adaptive filtering mimics the second processing and uses the digital samples of the interference and the digital samples on which the mathematical model is applied, converting received analog signals in the first frequency band into digital received signals, and cancelling from the digital received signals the interference using the digital samples for correction.

Thus, interference generated by signals transmitted by a radio device on a least one frequency band used by the radio device for receiving radio signals is cancelled.

The present invention also concerns, in at least one embodiment, a computer program that can be downloaded from a communication network and/or stored on a medium that can be read by a computer or processing device. The computer program includes instructions for causing implementation of the aforementioned method, or any of its embodiments, when said program is run by a processor.

The present invention also concerns an information storage means, storing a computer program including a set of instructions causing implementation of the aforementioned method, or any of its embodiments, when the stored information is read from said information storage means and run by a processor.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1A:
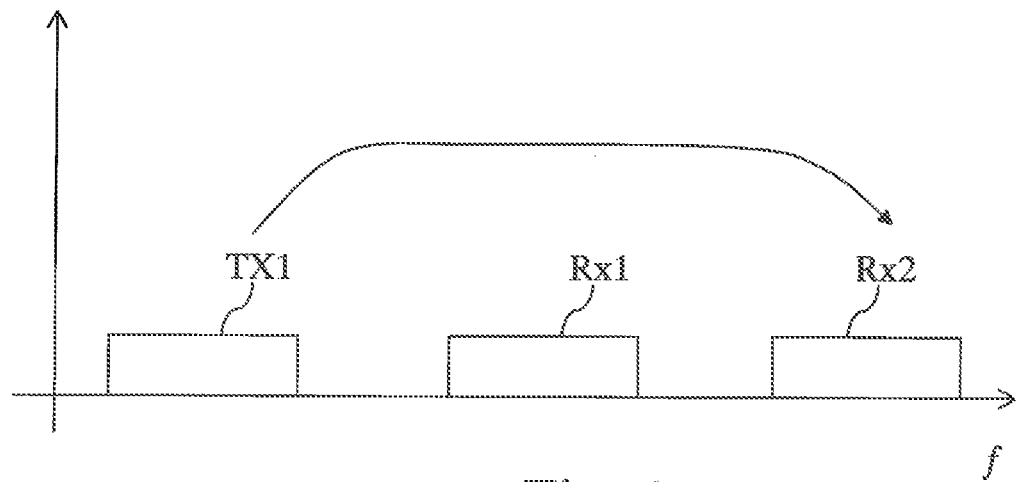
FIG. 1a schematically presents an example of harmonics generated on signals transmitted by a radio device in a first frequency band which fall into a frequency band used by the radio device for receiving signal.
Figure 1B:
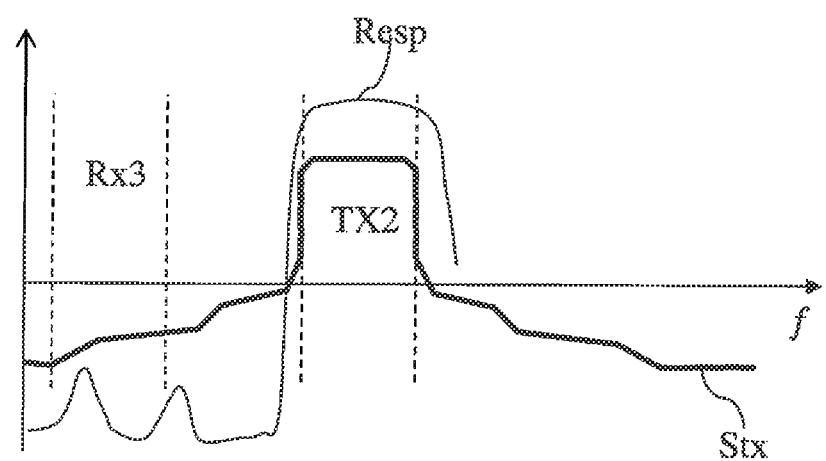
FIG. 1b schematically presents an example of noise generated due to non-linearity of various components in the transmission chain while signals are transmitted by a radio device in a frequency band, the noise falling into a frequency band used by the radio device for receiving signal.
Figure 2:
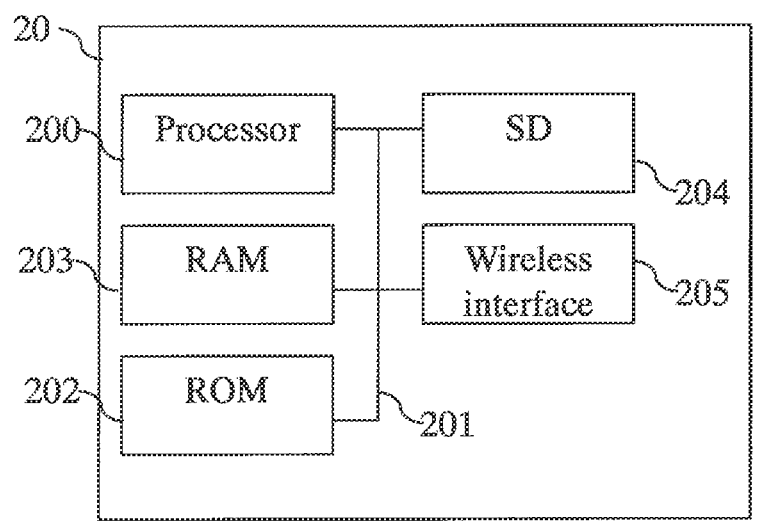
FIG. 2 schematically represents an architecture of a radio device in which the present invention is implemented.

FIG. 2 schematically represents an architecture of a radio device 20 in which the present invention is implemented.

The radio device 20 includes the following components interconnected by a communications bus 201: a processor, microprocessor, microcontroller or CPU (Central Processing Unit) 200; a RAM (Random-Access Memory) 203; a ROM (Read-Only Memory) 202; an SD (Secure Digital) card reader 204, or any other device adapted to read information stored on storage means; and a wireless interface 205.

The wireless interface 205 allows the radio device 20 to wirelessly communicate with another radio device.

CPU 200 is capable of executing instructions loaded into RAM 203 from ROM 202 or from an external memory, such as an SD card. When the radio device 20 is powered on, CPU 200 reads instructions from RAM 203 and executes the read instructions. The instructions form one computer program that causes CPU 200 to perform some or all of the steps of the algorithm described hereafter with regard to FIG. 4.

Figure 4:
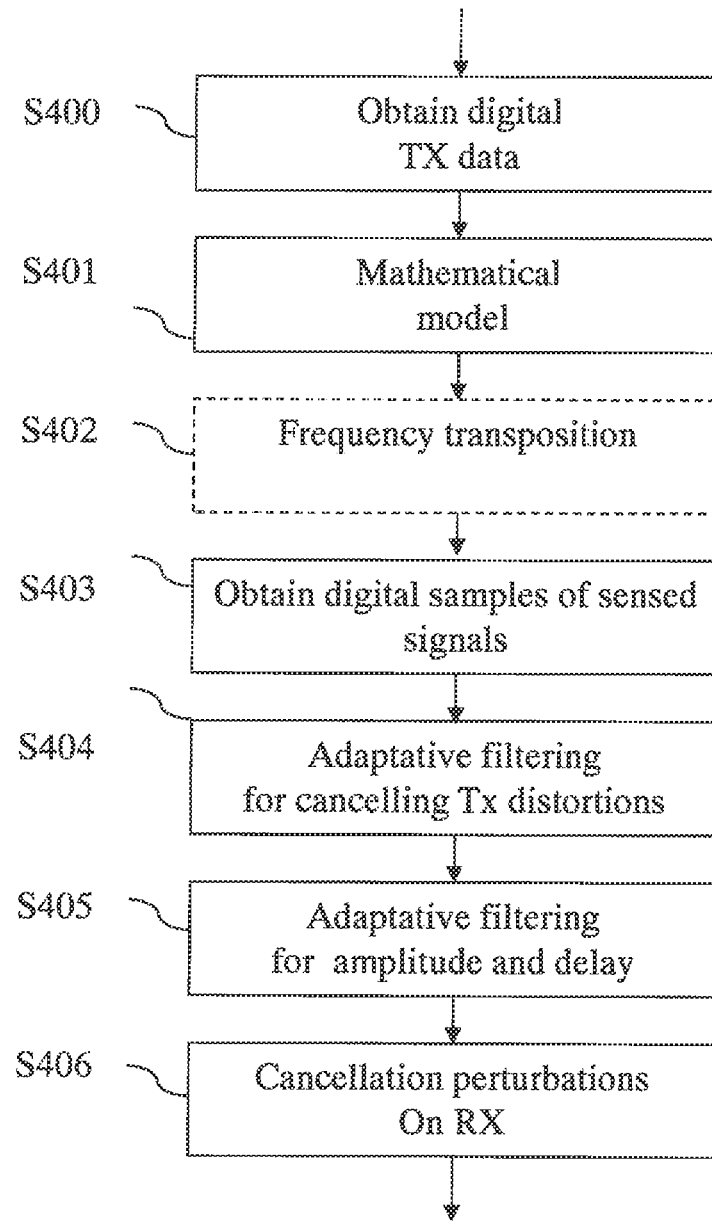
FIG. 4 represents an algorithm executed by the radio device according to the present invention.

Any and all steps of the algorithm described hereafter with regard to FIG. 4 may be implemented in software by execution of a set of instructions or computer program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the radio device 20 includes circuitry, or a device including circuitry, causing the receiver device to perform the steps of the algorithm described hereafter with regard to FIG. 4.

Such a device including circuitry causing the radio device 20 to perform the steps of the algorithm described hereafter with regard to FIG. 4 may be an external device connectable to the radio device 20.

The radio device 20 may also be a part of another device, for example when the radio device 20 is a chip, a chipset, or a module. Alternatively, instead of being a part of another device or connected to a dedicated communication device, the radio device 20, according to the invention, may provide communication capability to any suitable device, such as a computer device, a machine, for example a vending machine or a vehicle like a car or truck.

The term circuitry refers either to hardware implementation, consisting in analog and/or digital processing, or to a combination of hardware and software implementation, including instructions of computer program associated with memories and processor causing the processor to perform any and all steps of the algorithm described hereafter with regard to FIG. 4 or part of steps of the algorithm described hereafter with regard to FIG. 4.

Figure 3:
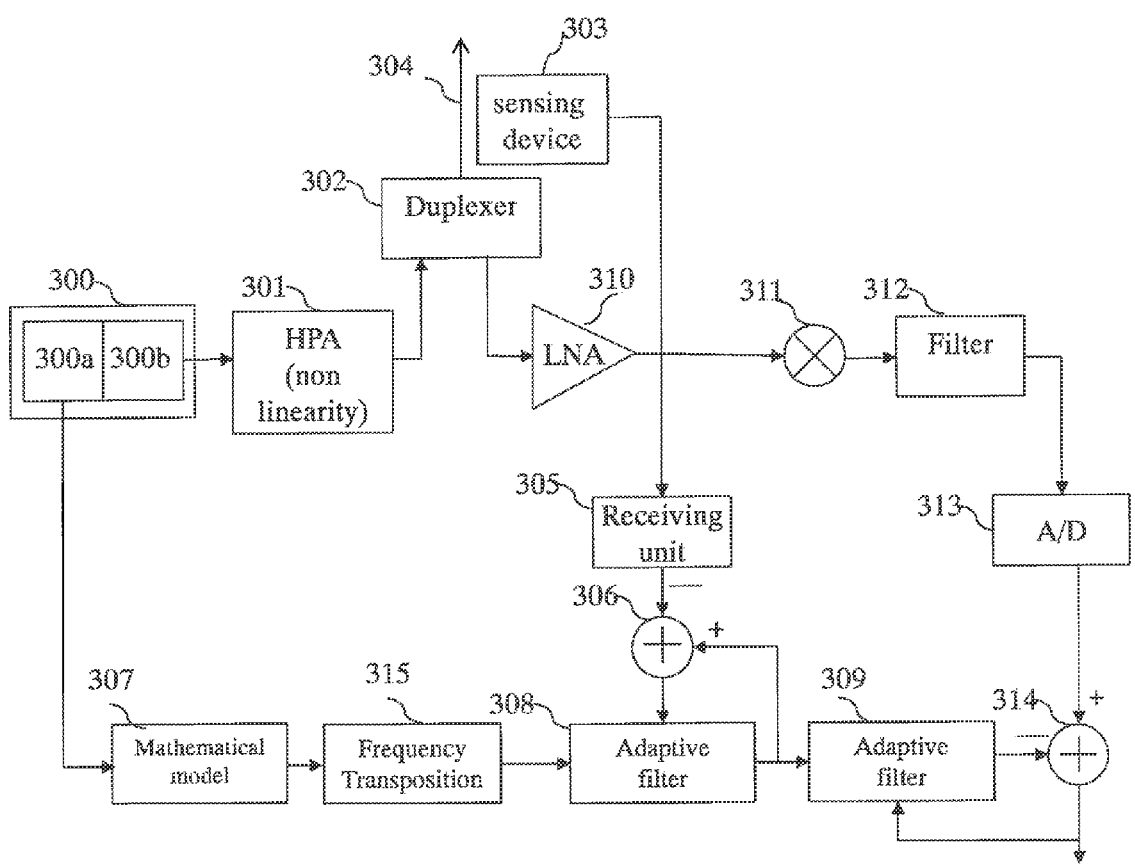
FIG. 3 schematically illustrates an example of a part of the wireless interface of the radio device according to the present invention.

FIG. 3 schematically illustrates an example of a part of the wireless interface of the radio device according to the present invention.

For clarity, this illustration is a simplified example, which describes some of the most necessary parts of such device, and the device may include several further components without departing from the scope of the invention. For simplification, the schematic also shows just a single signal chain for each signal path (transmit, receive, sensing). In actual implementation, more than one signal paths may exist in any of the signal chains. An example of such multiple paths is I (in phase) and Q (quadrature) paths.

The wireless interface 205 includes a Radio Frequency Integrated Circuit (RFIC) 300 which processes signals to be transmitted. The RFIC 300 includes a digital part 300a and an analog part 300b. The analog signals output by the RFIC 300 are processed by analog transmit signal processing chain, represented here with 301, which has non-linearity causing, in addition to processing the wanted signals for transmission, generation of unwanted signals which may appear in the frequency band used by the radio device 20 for receiving signals. For example, the analog signal processing chain may include a High Power Amplifier (HPA) 301, which is sometimes called a Power Amplifier. This amplifier may have adjustable gain. In addition to the exemplary HPA, the analog transmit signal processing chain may contain one or more further signal processing devices such as filters and/or amplifiers and/or mixers, all of which may introduce non-linearity. In this example, the signals from the analog signal processing chain 301 are fed to the antenna 304 through a duplexer 302. The duplexer 302 includes at least one processing unit which processes the signals in the frequency band used for transmitting signals and also the signals in the frequency band used by the radio device for receiving signals. The processing unit included in the duplexer 302 is for example a filter which introduces linear distortions on the signals amplified by the HPA 301.

In the receive side, the duplexer 302 is connected to a low noise amplifier 310 and a mixer 311 of a reception part of the wireless interface 205.

Interferences due to non-linearity introduced by the analog transmission chain 301 to 302 are found in the downlink signals received by the radio device 20 and are also amplified by the low noise amplifier 310.

The received signals are first amplified with a low noise amplifier 310 and then down-converted to a baseband frequency with one or more mixer elements 311, and the baseband frequency signal is then filtered by a filter 312. As at least some of the interferences due to non linearity are in the receive frequency band, they are not cancelled by the filter 312.

The filtered signals are converted into digital signals by an analog to digital converter 313.

According to the invention, a sensing device 303 is connected to the antenna 304 or to the signal path between the antenna and the radio device front-end and senses signals transferred by the radio device through the antenna 304. For example, and in a non limitative way, the sensing device 303 is a directive device like for example a directive coupler. A directive device 303 senses mainly the signals transmitted by the radio device 20 among the signals transferred and received by the radio device through the antenna 304. The directivity of the directive device enables differentiation of the transmitted analog signals from the received signals, even if they lay in the same frequency band. It should be understood that the connection of such sensing device 303 may be implemented in different ways depending on the type of the sensing device.

Examples of directive couplers are disclosed in part 7.6 of the book of David M. Pozar entitled "Microwave engineering", third edition, John Wiley & Sons, the disclosure of which is incorporated herein by reference in its entirety.

The signals sensed by the sensing device 303 are provided to a receiving unit 305. The receiving unit 305 is, for example, a reception chain used for control purpose. The receiving unit 305 at least converts the analog signals sensed by the sensing device 303 into digital signals. The receiving unit 305 is often embedded in most modern wireless transceivers as a measurement receiver used for various purposes like power control and/or antenna tuning.

The digital samples provided by the receiving unit 305 are provided to a subtracting module 306.

The subtracting module 306 subtracts the digital samples provided by the receiving unit 305 from the digital samples provided by an adaptive filter 308 and provides resulting samples to the adaptive filter 308.

According to the invention, the digital signals output by the digital RFIC part 300a are provided to a mathematical model module 307 that mimics the non linearity of the analog transmit signal processing chain 301.

The mathematical model module 307 generates samples of representation of the interferences resulting from the non-linearity in the analog transmit chain from the digital signals provided by the digital RFIC part 300a. For example, the mathematical model module 307 generates the second and/or the third harmonics and/or spectral regrowth representation.

The output of the mathematical model module 307 is provided to a frequency transposition module 315, which transposes the interferences resulting from the non-linearity into the frequency band used by the radio device 20 for receiving signals.

It has to be noted, that the frequency transposition module 315 may not be needed if the interferences resulting from the non-linearity are already in the frequency band used by the radio device 20 for receiving signals. According to the invention, the output of the frequency transposition module 315 or the output of the mathematical model module 307 is provided to an adaptive filter 308. The adaptive filter 308 generates a reference signal that mimics the interference as is in the received signal, caused in example by the duplexer, using the samples provided by the frequency transposition module 315 or the mathematical model module 307 and samples provided by the subtracting module 306. The adaptive filter 308 thus reproduces the non-linearity experienced by the transmitted signal in the analog transmission chain.

The samples of the reference signal provided by the adaptive filter 308 are fed to a second adaptive filter 309.

The second adaptive filter 309 adapts the amplitude and the delay of the samples provided by the adaptive filter 308 to the samples generated by the reception part 302, 310, 311, 312 and 313.

The samples outputted by the adaptive filter 309 are subtracted from the samples output by the analog to digital converter 312 by a subtracting module 314.

The samples provided by the subtracting module are then substantially free of interference introduced by the analog transmission chain 301 to 302.

FIG. 4 represents a method executed by the radio device according to the present invention.

The present method will be disclosed when it is executed by a CPU. The present method may also be implemented totally or partially in a hardware module.

At step S400, the CPU 200 obtains digital samples of data to be transferred.

At next step S401, the CPU 200 generates, from the digital samples obtained at step 400 a mathematical model that mimics the non linearity of the processing unit 301.

The mathematical model generates samples of representation of the interferences resulting from the non-linearity in the transmit chain from the digital signals provided by the digital RFIC part 300a. For example, the mathematical model module 307 generates the second and/or the third harmonics and/or spectral regrowth representation.

In step S402, the CPU 200 performs a frequency transposition of the samples of representation of the interferences resulting from the non-linearity into the frequency band used by the radio device 20 for receiving signals.

It has to be noted here that, the frequency transposition step S402 may not be needed if the interferences resulting from the non-linearity are already in the frequency band used by the radio device 20 for receiving signals. Optional characteristics of this step are highlighted with a dashed line. At step S403, the CPU 200 obtains digital samples of signals transferred by the radio device through the antenna 304 and sensed by the directive device 303. The step S403 may be executed after step S402 or in parallel with any of the steps S401 and/or S402.

At step S404, the CPU 200 performs an adaptive filtering. The adaptive filtering produces a reference signal that mimics the interference in the received signal, introduced for instance by the duplexer, using the samples provided by step S401 or S402 and samples provided by the step S403.

At step S405, the CPU 200 performs a second adaptive filtering of the samples provided by the step S404. More precisely, the CPU 200 adapts the amplitude and the delay of the samples provided by the adaptive filtering step S404 to the samples generated by the reception part 302, 310, 311 and 312.

At step S406, the CPU 200 subtracts the samples outputted by step S405 from the samples outputted by the analog to digital converter 312 in order to cancel interferences introduced by the analog transmission chain.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for cancelling, from signals received by a radio device in a first frequency band, interference generated by the radio device in the first frequency band when the radio device transmits simultaneously radio signals on at least a second frequency band, different from the first frequency band, the method comprising the following steps which cause the device to:
    convert digital signals to be transmitted to analog signals to be transmitted in the second frequency band,
    execute a first processing of the analog signals to be transmitted in the second frequency band, the first processing generating interference signals in the first frequency band due to non-linearity of the first processing,
    execute a second processing at least on the interference signals generated in the first frequency band,
    sense the interference signals in the first frequency band and convert the sensed interference in the first frequency band into digital samples of the interference,
    apply to the digital signals to be transmitted a mathematical model that mimics the non-linearity of the first processing,
    perform an adaptive filtering in order to provide digital samples for correction, wherein the adaptive filtering mimics the second processing and uses the digital samples of the interference and the digital samples on which the mathematical model is applied,
    convert received analog signals in the first frequency band into digital received signals, and
    cancel from the digital received signals the interference using the digital samples for correction.

2. The method according to claim 1, further comprising:
    transposing in frequency the digital samples on which the mathematical model is applied or the digital samples for correction.

3. The method according to claim 1, further comprising:
    adapting the amplitude and the delay of the digital samples for correction and/or of the digital received signals.

4. The method according to claim 3, wherein the adapting of the amplitude and the delay comprises executing an adaptive filtering on the digital samples for correction and/or the digital received signals.

5. The method according to claim 1, wherein the interference is sensed using a directive device.

6. The method according to claim 1, wherein the first processing of the analog signals to be transmitted comprises amplifying the analog signals to be transmitted.

7. The method according to claim 1, wherein the second processing on the signals generated in the first frequency comprises filtering the signals generated in the first frequency band by a filter with its pass band adapted for the second frequency band.

8. A radio receiving device for cancelling, from signals received by a radio device in a first frequency band, interference generated by the radio device in the first frequency band when the radio device transmits simultaneously radio signals on at least a second frequency band, different from the first frequency band, the device comprising a processor and circuitry causing the device to:
    convert digital signals to be transmitted to analog signals to be transmitted in the second frequency band,
    execute a first processing on the analog signals to be transmitted in the second frequency band, the first processing generating interference signals in the first frequency band due to non-linearity of the first processing, execute a second processing at least on the interference signals generated in the first frequency band, sense the interference signals in the first frequency band and convert the sensed interference in the first frequency band into digital samples of the interference, apply to the digital signals to be transmitted a mathematical model that mimics the non-linearity of the first processing, perform an adaptive filtering in order to provide digital samples for correction, wherein the adaptive filtering mimics the second processing and uses the digital samples of the interference and the digital samples on which the mathematical model is applied, convert received analog signals in the first frequency band into digital received signals, and cancel from the digital received signals the interference using the digital samples for correction.

9. The device according to claim 8, further comprising circuitry causing the device to:

transpose in frequency the digital samples on which the mathematical model is applied or the digital samples for correction.

10. The device according to claim 9, further comprising circuitry causing the device to:

adapt the amplitude and the delay of the digital samples for correction and/or of the digital received signals.

11. The device according to claim 10, wherein the adapting of the amplitude and the delay of the digital samples comprises executing an adaptive filtering on the digital samples for correction and/or the digital received signals.

12. The device according to claim 8, further comprising circuitry causing the device to sense the interference using a directive device.

13. The device according to claim 8, wherein the circuitry for executing the first processing on the analog signals to be transmitted comprises an amplifier.

14. The device according to claim 8, wherein the circuitry for executing the second processing on the signals generated in the first frequency band comprises a filter with its pass band adapted for the second frequency band.

15. A non-transitory computer-readable storage medium comprising a set of computer-readable instructions stored thereon, which, when executed by an apparatus which comprises a processor, causes the apparatus to implement the method according to claim 1.

* * * * *